US006941227B2

(12) United States Patent
Goloshubin et al.

(10) Patent No.: US 6,941,227 B2
(45) Date of Patent: Sep. 6, 2005

(54) FREQUENCY-DEPENDENT PROCESSING AND INTERPRETATION (FDPI) OF SEISMIC DATA FOR IDENTIFYING, IMAGING AND MONITORING FLUID-SATURATED UNDERGROUND RESERVOIRS

(75) Inventors: Gennady M. Goloshubin, Sugar Land, TX (US); Valeri A. Korneev, Lafayette, CA (US)

(73) Assignee: The Regents of the University of California, Oakland, CA (US)

( * ) Notice: Subject to any disclaimer, the term of this patent is extended or adjusted under 35 U.S.C. 154(b) by 146 days.

(21) Appl. No.: 10/137,201

(22) Filed: Apr. 30, 2002

(65) Prior Publication Data

US 2002/0185329 A1 Dec. 12, 2002

Related U.S. Application Data

(60) Provisional application No. 60/287,446, filed on Apr. 30, 2001.

(51) Int. Cl.[7] .............................................. G01V 1/28
(52) U.S. Cl. ............................................ 702/17; 702/16
(58) Field of Search ............................. 702/11–14, 17; 367/73

(56) References Cited

U.S. PATENT DOCUMENTS

| | | | | |
|---|---|---|---|---|
| 3,582,873 A | * | 6/1971 | George et al. ................. | 367/40 |
| 4,449,208 A | | 5/1984 | Moeckel et al. | |
| 5,311,484 A | * | 5/1994 | Anderson et al. ............. | 367/38 |
| 5,508,973 A | * | 4/1996 | Mallick et al. ................ | 367/38 |
| 5,796,678 A | * | 8/1998 | Pisetski ......................... | 367/38 |
| 6,138,075 A | | 10/2000 | Yost | |
| 6,498,989 B1 | * | 12/2002 | Pisetski et al. ................ | 702/14 |

OTHER PUBLICATIONS

Cadoret, T. et al. "Fluid distribution effect on sonic attenuation in partially saturated limestones," *Geophysics* Jan.–Feb. 1998, pp. 154–160, vol. 63, No. 1.
CEMAT "What is seismic migration?" at <<http://www.seismo.unr.edu/cemat/migration.html>> visited on Mar. 12, 2002, 1 page total.
Dasgupta, R. and Clark, R.A. "Estimation of Q from surface seismic reflection data," *Geophysics* Nov.–Dec. 1998, pp. 2120–2128, vol. 63, No. 6.
Goloshubin, G.M. and Bakulin, A.V. "Seismic reflectiviy of a thin porous fluid–saturated layer versus frequency," *SEG Expanded Abstracts* 1998, pp. 976–979.
Goloshubin, G.M. and Korneev, V.A. "Seismic low frequency effects from fluid–saturated reservoir," *SEG Expanded Abstracts with Biographies, 2000 Technical Program, Calgary* Aug. 6–Aug. 11, 2000, pp. 1671–1674.

(Continued)

*Primary Examiner*—Donald McElheny, Jr.
(74) *Attorney, Agent, or Firm*—William Michael Hynes; Townsend and Townsend and Crew LLP

(57) ABSTRACT

A method for identifying, imaging and monitoring dry or fluid-saturated underground reservoirs using seismic waves reflected from target porous or fractured layers is set forth. Seismic imaging the porous or fractured layer occurs by low pass filtering of the windowed reflections from the target porous or fractured layers leaving frequencies below lowmost corner (or full width at half maximum) of a recorded frequency spectra. Additionally, the ratio of image amplitudes is shown to be approximately proportional to reservoir permeability, viscosity of fluid, and the fluid saturation of the porous or fractured layers.

7 Claims, 13 Drawing Sheets

OTHER PUBLICATIONS

Goloshubin, G.M. et al. "Laboratory experiments of seismic monitoring," *EAGE 58th Conference and Technical Exhibition, Amsterdam, The Netherlands*, Jun. 3–7, 1996–Geophysical Division, 2 pages total.

Gradshteyn, I.S. and Ryzhik, I.M. *Table of Integrals, Series and Products*. Academic Press Inc., New York, NY., 1965, pp. ix–xxii (Table of Contents Only).

Hauge, P.S. "Measurements of attenuation from vertical seismic profiles," *Geophysics* Nov. 1981, pp. 1548–1558, vol. 46, No. 11.

Jones, T.D. "Pore fluids and frequency–dependent wave propagation in rocks," *Geophysics* Oct. 1986, pp. 1939–1953, vol. 51, No. 10.

Parker, S.P. ed. "Full width at half maximum," *Dictionary of Scientific and Technical Terms*, Fifth Edition, McGraw–Hill, Inc., 1993, pp. 815.

Pujol. J.M. et al. "Seismic wave attenuation in metamorphic rocks from VSP data recorded in Germany's continental super–deep borehole," *Geophysics* Mar.–Apr. 1998, pp. 354–365, vol. 63, No. 2.

Raikes, S.A. and White, R.E. "Measurements of earth attenuation from downhole and surface seismic recordings," *Geophysical Prospecting* 1984, pp. 892–919, vol. 32.

Sams, M.S. et al. "The measurement of velocity dispersion and frequency–dependent intrinsic attenuation in sedimentary rocks," *Geophysics* Oct. 1997, pp. 1456–1464, vol. 62, No. 5.

Sheriff, R.E. *Encyclopedic Dictionary of Exploration Geophysics*. Third Edition, Society of Exploration Geophysicists, Tulsa, OK; 1991, 3 pages total.

Toksöz, M.N. and Johnston, D.H. eds. *Seismic Wave Attenuation: Geophysics Reprint Series, No. 2*. 1981, Society of Exploration Geophysicists, Tulsa, Oklahoma, pp. iii–iv (Table of Contents Only).

Waddell, M.G. et al. "Use of seismic reflection amplitude versus offset (AVO) techniques to image dense nonaqueous phase liquids (DNAPL)," pp. 1–12.

* cited by examiner

HIGH FREQ.
(h/λ > 1)

LOW FREQ.
(1 > h/λ < 0.2)

VERY LOW FREQ.
(h/λ < 0.2)

FREQUENCY-DEPENDENT PROCESSING AND INTERPRETATION (FDPI) OF SEISMIC DATA FOR IDENTIFYING, IMAGING AND MONITORING FLUID-SATURATED UNDERGROUND RESERVOIRS

CROSS-REFERENCES TO RELATED APPLICATIONS

This application claims priority from U.S. Provisional Patent Application Ser. No. 60/287,446, filed Apr. 30, 2001 entitled Frequency Dependent Processing and Interpretation (FDPI) of Seismic Data for Identification, Imaging, and Monitoring of Fluid Saturated Underground Reservoirs.

STATEMENT AS TO RIGHTS TO INVENTIONS MADE UNDER FEDERALLY SPONSORED RESEARCH AND DEVELOPMENT

This invention was made with U.S. Government support under Contract Number DE-AC03-76SF00098 between the U.S. Department of Energy and The Regents of the University of California for the management and operation of the Lawrence Berkeley National Laboratory. The U.S. Government has certain rights in this invention.

A method using seismic waves reflected from target porous or fractured layers for identifying, imaging and monitoring fluid-saturated underground reservoirs is set forth. Seismic data is processed at low bandpass portions of seismic waves reflected from a target porous layer. Frequency-dependent processing and interpretation of reservoirs occurs when the target reflection exhibits increasing phase delays as frequency approaches a lowest corner of a recorded frequency spectra. Additionally, at low frequencies the reflection amplitudes and decrease of the derivative of amplitude with respect to frequency, are shown to be approximately proportional to the reservoir permeability, viscosity of fluid, and the fluid saturation of the porous or fractured layers.

BACKGROUND OF THE INVENTION

Identification, imaging and monitoring of fluid-saturated underground reservoirs is a very important application of seismic methods. It helps find and contour gas and oil deposits, which are usually attributed to fluid-saturated porous or fractured geological layers. It also has important applications for underground water reservoir imaging, estimation of contamination zones, and monitoring of underground gas storage, as well as for addressing the global issue of $CO_2$ sequestration. The current very high percentage of "dry" drilled industry wells may be substantially lowered if a more accurate imaging method can be found.

It is commonly known and accepted that thin layers in the earth (with thicknesses less than a fraction of a dominant wavelength [$\lambda$]) of seismic waves are invisible to imaging using seismic waves. Waves reflected from a bottom and a top of such a layer have opposite signs and nearly equal amplitudes. The result is that such waves almost cancel one another, resulting in the layer being obscured in the seismic data. Typically this means that traditional seismic methods cannot image layers less than 10 meters thick.

The relationship between seismic response and fluid saturation in a reservoir depends on many factors, such as porosity and permeability of the reservoir rocks, viscosity and compressibility of the fluid, reservoir thickness and physical properties of the surrounding medium. (See "Seismic Wave Attenuation," 1981, Geophysics reprint series, No. 2: SEG, D. H. Jonson and M. N. Toksoz, editors.). But there is some general connection between the character of porous layer saturation and seismic response. In particular, comparing cases of water and gas saturation, phase shifts and energy redistribution between different frequencies are known. (See Goloshubin, G. M. et al., 1996, "Laboratory experiments of seismic monitoring," 58th EAEG Meeting, Amsterdam, and Goloshubin, G. M., and Bakulin, A. V., 1998, "Seismic reflectivity of a thin porous fluid-saturated layer versus frequency" 68th SEG Meeting, New Orleans, 976–979.)

Experimental studies have shown that intrinsic attenuation is strongly affected by the porous media and fluid saturation. (See Hauge, P. S., 1981, "Measurements of attenuation from vertical seismic profiles" Geophysics, 46, 1548–1558; Raikes, S. A. and White, J. E., 1984, "Measurements of earth attenuation from downhole and surface seismic recording" Geophysical Prospecting, 32, 892–919; "Seismic Wave Attenuation," 1981, Geophysics reprint series, No. 2: SEG, D. H. Jonson and M. N. Toksoz, editors; Sams, M. S. et al., 1997, "The measurement of velocity dispersion and frequency-dependent intrinsic attenuation in sedimentary rocks," Geophysics, 62, 1456–1464; Dasgupta, R. and Clarc, R. A, 1998, "Estimation of Q from surface seismic reflection data," Geophysics, 63, 2120–2128; Goloshubin, G. M. and Komeev, V. A., 2000, "Seismic low frequency effects for fluid-saturated porous media," Expanded Abstracts, SEG Meeting, Calgary, 976–979. )

It is well accepted that the nondimensional attenuation quality factor Q is frequency-dependent and changes dramatically with liquid saturation and may be less than 10 in sedimentary rocks (See Jones, T. D., 1986, "Pore fluids and frequency-dependent wave propagation in rocks," Geophysics, 51, 1939–1953, and Sams [above]). Fluid may lower Q in metamorphic rocks (Pujol, J. M. et al., 1998, "Seismic wave attenuation in metamorphic rocks from VSP data recorded in Germany's continental super-deep borehole," Geophysics, 63, 354–365) down to 14 and in limestone (Gadoret, T. et al., 1998, "Fluid distribution effects on sonic attenuation in partially saturated limestones," Geophysics, 63, 154–160) from 200 (dry) to 20–40 (water-saturated).

It is also typically accepted in seismology that attenuation quality factor Q usually has values well above 20, which means that it takes more than 20 wavelengths for a wave to propagate before its amplitude is reduced by more than a half of an original value.

DISCOVERY

We have discovered the existence of very low, high attenuation, quality factor Q (Q<5) as a local value for a fluid-saturated porous or fractured layer interrogated by low frequency seismic waves. Typical seismic measurements give much higher values of Q over such a region because they represent average effective values where the thin layers have a very small contribution. Investigation of such layers at the low frequency portion of the exciting seismic waves reveals, for a thin layer with high attenuation (low Q), that waves are reflected from the top and the bottom of the layer with very dissimilar amplitudes. These dissimilar amplitudes do not cancel each other, and thereby render the thin layer detectable. Specifically, for saturated porous layers, as frequency decreases, attenuation increases.

Two other important observed features of reflected seismic waves from fluid-saturated porous layers have been discovered. First, the low-frequency portions of the exciting seismic vibrations include stronger reflections at the low frequencies. Second, an apparent anomalous velocity dispersion occurs in the reflected waves where high frequencies arrive earlier than low frequencies. These properties have been observed in both laboratory and field seismic data.

The following disclosure stems from a frequency-dependent reflectivity of the fluid-saturated layer by a frictional model with low, frequency-dependent Q values at low frequencies.

BRIEF SUMMARY OF THE INVENTION

A method of identification, imaging and monitoring of fluid-saturated underground reservoirs using seismic waves reflected from target porous or fractured layers is set forth. Reflective wave seismic data is processed at low frequency spectral portions of the seismic waves reflected from target porous layers. Frequency-dependent processing and interpretation (FDPI) is based on use of one or several frequency dependent reflection properties in the vicinity of a low frequency corner of recorded wave spectra. These properties include: amplitude spectra $A(\omega)$, amplitude derivative with respect to frequency $$\frac{dA}{d\omega},$$

phase derivative with respect to frequency $D_p(\omega)$. It has been found that changes in of all these properties in saturated samples, when compared to unsaturated samples are approximately proportional to both the fluid viscosity and the fluid saturation of the reservoir. Fluid saturation and content profiling of an underground layer or reservoir is made possible by using a two-dimensional (2D) plot.

The frequency dependence of seismic reflections from a thin, fluid-saturated, porous layer has been studied. Reflections from a thin, water-saturated layer was found to have increased amplitude and delayed travel time at low frequencies for both ultrasonic lab data and seismic field data. A comparison of these results to laboratory modeling with a frictional-viscous theoretical model was then made. The measured data was best explained by low (Q<5) values of the attenuation parameter Q and its decrease as frequency approaches zero.

At a larger scale, conventional processing of time-lapse Vertical Seismic Profiling (VSP) data found minimal changes in seismic response of a gas storage reservoir when the reservoir composition changed from gas- to water-saturated. However, in contrast, by using low-frequency analysis, we have found significant seismic reflection attribute variation as a function of frequency. In this case, the reflection attribute variation was found in the range of 15–50 Hz.

For the low frequencies used here, a proposed explanation suggests that very low Q values are present for fluid-saturated porous or fractured layers, primarily as a result of internal friction between grains, pores, or fracture walls. The frequency-dependent amplitude and phase reflection properties can be used to detect and monitor liquid saturated layers, primarily as a result of internal friction between grains or fracture walls, as well as to detect and monitor liquid-saturated areas in thin porous layers.

This method uses seismic data $u(x, t)$ recorded in space (x) and time (t) for a conventional surface-to-surface, or surface-to-borehole registration after standard seismic data pre-processing. Waves $w(x,t)$ reflected from target porous layers should be identified on $u(x,t)$ using independent measurements such as borehole core analysis and Vertical Seismic Profiling. Depth localization of the reservoir can also be determined by conventional methods using the high frequency parts of reflected waves. Waves $w(x0,t)$ recorded at location $x0$ of the borehole represent a reference wave. Where no borehole data exists, any target reflected wave could alternatively be used as a reference wave.

Using the Fourier spectrum $W(x,\omega)$ and $W(x0,\omega)$ of the functions $u(x,t)$ and $u(x0,t)$, the complex ratio $R(x,\omega)=W(x,\omega)/W(x0,\omega)$ is analyzed for first N reliably recorded low frequencies, to compute average relative reflected amplitude $$A(x) = \frac{1}{N}\sum_{i=1}^{N} |R(x, \omega_i)|,$$

the negative of the derivative of the average amplitude with respect to frequency $$D_A(x) = -\frac{1}{N}\sum_{i=1}^{N} d|R(x, \omega_i)|/d\omega,$$

and derivative of the average time delay with respect to frequency $$D_P(x) = \frac{1}{N}\sum_{i=1}^{N} d(\arg(R(x, \omega_i)/\omega_i))/d\omega.$$

Number N includes all reliably recorded frequencies below the low frequency corner of a recorded spectra.

By reliably recorded frequencies, we refer to frequencies whose Fourier amplitudes exceed the noise floor level found in the particular data set. Such noise floor level is comprised of many sources: source noise, receiver noise, electrical line noise, digitization errors, and in this instance reservoir geology. In particular, the reservoir geology can contribute considerable noise by quarter wavelength $$\frac{\lambda}{4}$$

frequency addition and cancellation, or tuning effects.

Fluid saturation can be mapped by using any of $A(x)$, $D_A(x)$, or $D_P(x)$, with calibration conditions $A(x_0)=1$, $D_A(x_0)=0$, and $D_P(x_0)=0$ at the location $x=x_0$. A relative change in these fields is approximately proportional to the viscosity of fluid and the fluid saturation of the porous or fractured layers. If the saturation characteristics data are available for the location $x=x_0$, in the points of drilled wells, then zones with $A(x)\approx 1$, $D_A(x)\approx 0$, and $D_P(x)\approx 0$ can be attributed to the same value of saturation.

For monitoring purposes the changes of anomalous zones configurations indicate the movement of fluid-saturated zones in development and propagation.

Method Overview

The internal friction dissipation mechanism explains all of the above properties of waves reflected from the porous layers and provides an effective procedure for imaging such layers. For a one-dimensional compressional wave propagation, the equation of motion has the form $$\frac{d^2u}{dt^2} - \beta\frac{du}{dt} - \gamma\frac{d^2}{dx^2}\frac{du}{dt} - v^2\frac{d^2u}{dx^2} = 0, \quad (1)$$

where u is a displacement vector. The first term represents the inertia. The second term in the equation is the frictional dissipative force. The third term describes viscous damping. The final term represents elastic portion of the wave propagation. The constants $\beta$, and $\gamma$ are respectively the "frictional" and "viscous" attenuation parameters.

In frequency domain, the terms of Equation (1) respectively relate to frequency ($\omega$) as follows:

$$\omega^2\omega\omega^3\omega^2.$$

As frequency decreases, the frictional dissipative force dominates ($\omega$). Physical interpretation of these parameters ($\beta$, and $\gamma$) is a separate issue and is not discussed here. Parameter v is a phase velocity in a non-dissipative medium. An analytical solution of this equation exists and has the form $$u = e^{ikx - \alpha x} e^{i\alpha x} \quad (2)$$

with wave number k, attenuation coefficient $\alpha$ and angular frequency $\omega$. The attenuation parameter Q is defined through the expression $$Q = \omega/2\alpha v \quad (3)$$

Parameter Q describes the effective dissipation of a medium.

From the structure of Eq. (1), it follows that the frictional term dominates at low frequencies, while the viscous term dominates at high frequencies; therefore, the viscosity is the main factor responsible for wave dissipation. Substitution of Eq. (2) in Eq. (1) gives the following expressions $$\alpha = \frac{vp}{q}, \quad k = \frac{\omega q}{v} \quad (7)$$

$$\text{where } q = \sqrt{\frac{1}{2} - p\gamma + \sqrt{\frac{1}{4} + \frac{p}{2}\left(\frac{v^2\beta}{\omega^2} - \gamma\right)}}, \quad (8)$$

$$p = \frac{1}{2}\omega^2\gamma + \frac{v^2\beta}{v^4 + \omega^2\gamma^2}$$

$$\text{When } \gamma = 0, \quad q = \frac{1}{\sqrt{2}}\sqrt{1 + \sqrt{1 + \frac{\beta^2}{\omega^2}}}, \quad p = \frac{\beta}{2v^2}. \quad (9)$$

When $\beta < \omega$, $Q \approx \sqrt{\omega/2\beta}$, while for $\omega > \beta$ we have $Q \approx \omega/\beta$. When $\beta = 0$, $$q = \sqrt{\frac{1}{2} - p\gamma + \sqrt{\frac{1}{4} + \frac{p}{2}\gamma}}, \quad p = \frac{1}{2}\omega^2\frac{\gamma}{v^4 + \omega^2\gamma^2}, \quad (10)$$

and $Q \approx \omega^{-1}$ at low frequencies.

Thus the decrease of Q at low frequencies can be explained by the presence of a frictional dissipation mechanism.

The suggested method uses two kinds of frequency-dependent information about a wave reflected from target layers: apparent dispersion of velocity and dependence of amplitude on frequency. Each of the mapping functions A(x), $D_A$(x), and $D_P$(x) can be used independently, although combining two or all three of them brings the most reliable results. All measurements here are to be done for the lower part of seismic signal frequencies, when the layer thickness is substantially less than a dominant wavelength.

DETAILED DESCRIPTION OF THE INVENTION

Defined Terms

Figure 1A:
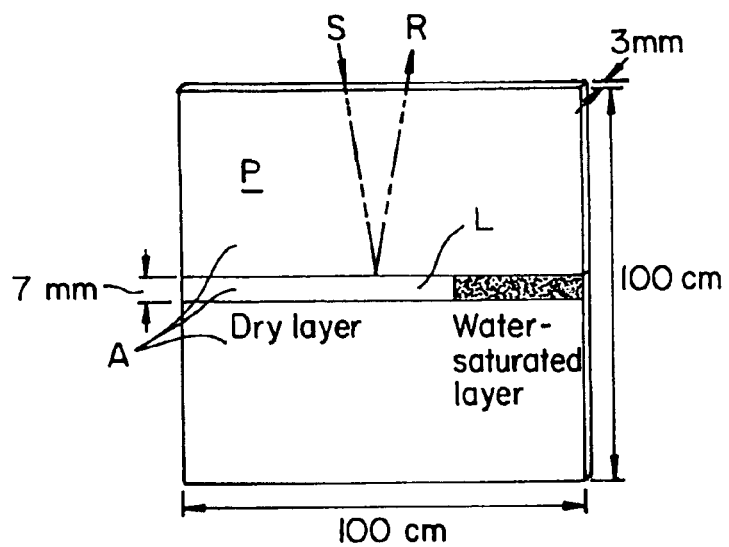
FIG. 1A is an elevation view of a laboratory experiment having a source (S) generating a seismic wave for reflection (R) from a porous layer where the porous layer has only the right-hand portion of the layer saturated with water.

Computer: any device capable of performing the steps developed in this invention to result in an optimal waterflood injection, including but not limited to: a microprocessor, a digital state machine, a field programmable gate array (FGPA), a digital signal processor, a collocated integrated memory system with microprocessor and analog or digital output device, a distributed memory system with microprocessor and analog or digital output device connected with digital or analog signal protocols.

Computer readable media: any source of organized information that may be processed by a computer to perform the steps developed in this invention to result in an optimal waterflood injection, including but not limited to: a magnetically readable storage system; optically readable storage media such as punch cards or printed matter readable by direct methods or methods of optical character recognition; other optical storage media such as a compact disc (CD), a digital versatile disc (DVD), a rewritable CD and/or DVD; electrically readable media such as programmable read only memories (PROMs), electrically erasable programmable read only memories (EEPROMs), field programmable gate arrays (FGPAs), flash random access memory (flash RAM); and remotely transmitted information transmitted by electromagnetic or optical methods.

Standard processing means processing an input data set having the same sample time period. Initially, the data set is preprocessed according to traditional methods. Then the data undergoes velocity analysis to investigate a particular layer of the geology. After velocity analysis, a subsequent analysis is done to compute an output image usable for oil exploration or petroleum reservoir analysis. These subsequent analytical techniques include traditional stacking, migration, and amplitude versus offset (AVO) processing.

Preprocessing means applying traditional signal "clean up" operations used in geological analysis to correct for amplitude variations, timing offsets, voltage offset, etc. so that the preprocessed data set is ready without further modification to be input into standard processing.

Basis function transform means a mathematical transformation or mapping of an input signal into a linear combination of mathematical functions orthogonal over an interval. Such basis functions can be sine and cosine waves as in Fourier spectral analysis, or other polynomial functions such as Bessel, Legendre, trigonometric, or hyperbolic functions. A standard reference for such orthogonal functions includes Gradshteyn and Ryzhik's, "Table of Integral Series and Producst," Academic Press Inc., 1965. A more recent approach has been used in seismic analysis with wavelet transformation, which used to filter an input signal into a linear combination of wave packets having different center frequencies and temporal shapes.

Frequency Dependency

The frequency dependence of seismic reflections from a thin, fluid-saturated, porous or fractured layer was considered. Reflections from a thin, water-saturated layer have increased amplitude and delayed travel time at low frequencies for both ultrasonic lab data and seismic field data. The results of laboratory modeling were compared with a frictional-viscous theoretical model to find that low (Q<5) values of the attenuation parameter Q and its monotonic increase with frequency explained the observations.

On a larger scale, conventional processing of time-lapse VSP data found minimal changes in seismic response of a gas-storage reservoir when the reservoir changed from gas to water-saturated. However, low-frequency analysis found significant seismic reflection attribute variation as a function of frequency, in the range of about 15–50 Hz. These observations corresponded to previously measured effects in laboratory data and theory. The frequency range below 15 Hz was discarded due to the noise floor level of this particular instrumentation system and reservoir.

A proposed explanation suggests very low Q values for porous or fractured fluid-saturated layers, primarily as a result of internal friction between grains or fracture walls. The frequency-dependent amplitude and phase reflection properties presented here can be used for detecting and monitoring layers, to detect and monitor liquid-saturated areas in thin porous and fractured layers.

A series of ultrasonic laboratory experiments were used to investigate the wave fields reflected from and transmitted through a porous layer with varying water saturation from a source S to a receiver R. The physical model (FIG. 1A) consisted of two 3 mm thick Plexiglas sheets P with a sealed void filled with porous artificial sandstone. The artificial sandstone A was prepared using a natural sand and clay mixture. The thickness of the artificial sandstone plate was 3 mm and it was much less than a wavelength. Therefore 2D physical modeling was used, where the Plexiglas was simulating a homogeneous constant-velocity background medium.

The porous layer L in each case was made of artificial sandstone with the same sizes of sand and clay grains, and was hermetically sealed to allow its saturation by fluid. The experiment found the acoustic impedance of the water-saturated sandstone was higher than the impedance of non-saturated sandstone. The Plexiglas had the lowest impedance. The expected reflection coefficient of the water-saturated sandstone was higher than for the dry sandstone.

The physical modeling data were recorded using experimental setup shown on FIG. 1 for both dry and water saturated sandstone. The layer had a 7 mm vertical dimension and had 0.32 porosity and about 300 mDarcy permeability. The velocities and densities of the used materials were: $V_p$=1700 m/sec, $V_s$=1025 m/sec, D=1800 kg/m3 (dry layer); $V_p$=2100 m/sec, $V_s$=1250 m/sec, D=2500 kg/m3 (water-saturated layer); and $V_p$=2300 m/sec, $V_s$=1340 m/sec, D=1200 kg/m3 (Plexiglas).

Waves reflected from the layer were recorded. A significant difference is seen between the seismic response of the porous, water-saturated zone and non-saturated (dry) zone (FIG. 1B). The water-saturated zone is distinguished due to a phase shift and loss of high-frequency energy. The low-frequency "bright spot" is associated with water saturation (FIG. 1D).

Figure 2A:
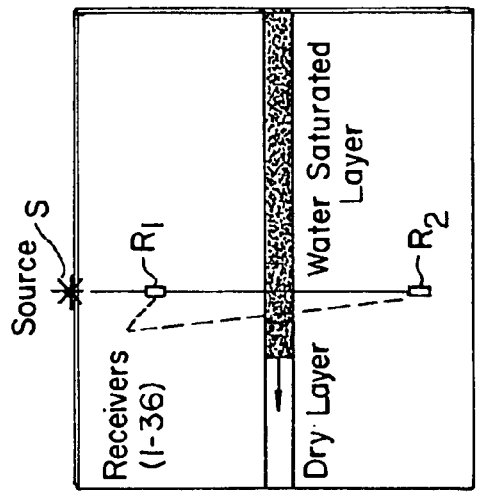
FIGS. 2A and 2B are respective laboratory models of a dry porous layer slowly flooded with water from right to left.
Figure 2B:
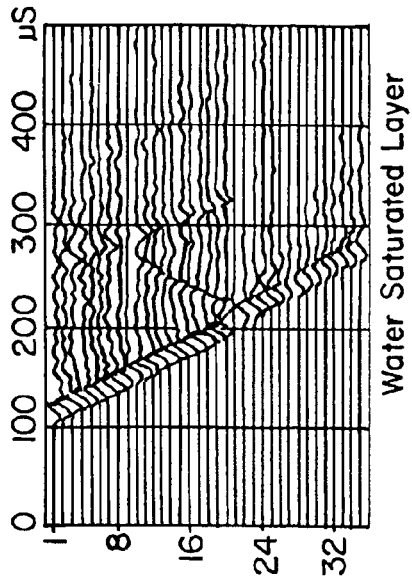
Figure 2C:
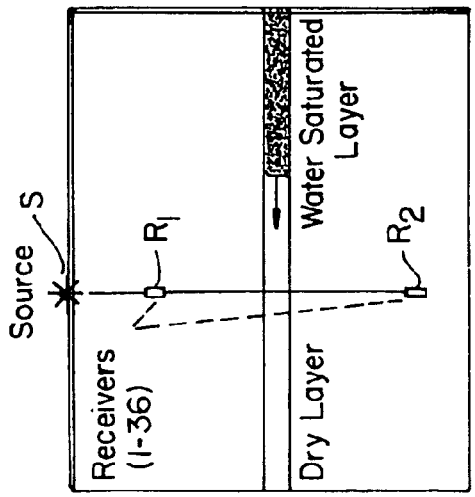
FIGS. 2C and 2D are respective vertical seismic profiles of the dry porous layer and the saturated porous layer corresponding to FIGS. 2A and 2B.
Figure 2D:
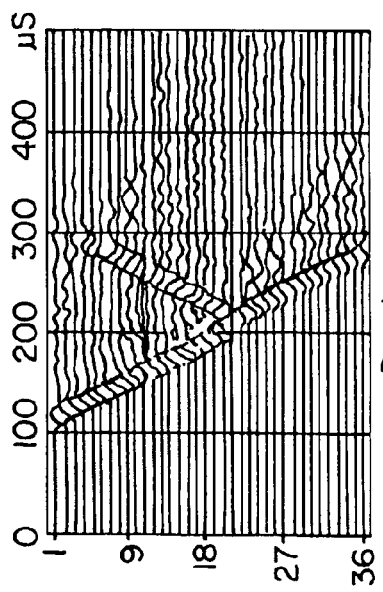

VSP observation geometry shown in FIGS. 2B to 2D illustrate one example from the series of experiments. Referring to FIGS. 2A and 2B, the reflection coefficient of the thin (7 mm) layer was investigated using a similar model to the one set forth in FIG. 1A. This time source S transmitted to receivers $R_1$ and $R_2$. VSP observation geometry is set forth in FIGS. 2C and 2D for the respective dry and water-saturated layers. The offset was much smaller than the depth to the layer and the reflection angle was practically equal to zero. There is a substantial difference between the upgoing wave field from the water-saturated layer and the upgoing wave field from the dry layer, whereas the transmitted field shows no such difference.

The physical modeling data were recorded using VSP experimental setup shown on FIG. 1 to measure of Q factor vs. frequency in thick porous layer for both dry and water saturation. The layer was 40 mm thick and had 0.32 porosity.

Figure 3:
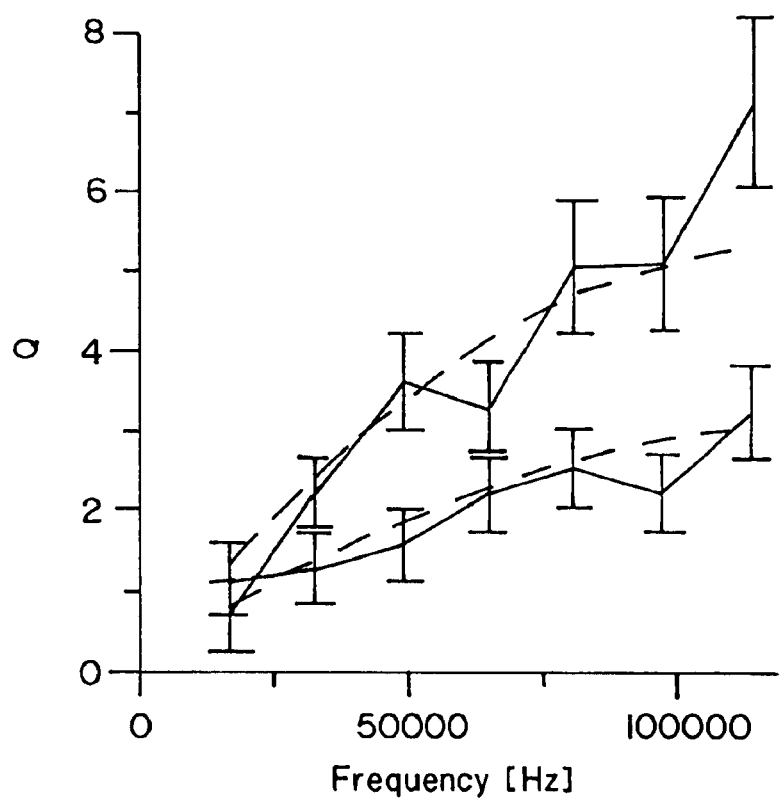
FIG. 3 is a plot of theoretical and experimental attenuation, Q, versus frequency data, with the experimental data shown in solid lines and theoretical data being shown in broken lines, demonstrating that attenuation is greater for water-saturated layers.

To measure Q as a function of frequency, a set of special experiments was conducted for a thick porous layer where reflected and refracted waves could be detected without interference. This was done for both dry and water-saturation cases using the same VSP observation system shown in FIGS. 2A and 2B. The porous layer of artificial sandstone was prepared with the same composition of sand and clay as for the previous experiment. In both cases, a transmitted wave was used to determine Q. The measured values of Q, together with their theoretical approximations are shown in FIG. 3. Note the frequency-dependent, low values of Q.

In FIG. 3, plots of Q versus frequency are shown for dry layers (upper plots) and for water-saturated layers (lower plots). Each set of plots has experimental data (solid lines) and theoretical data (dashed lines). The values of Q are substantially lower as frequency increases.

Figure 4:
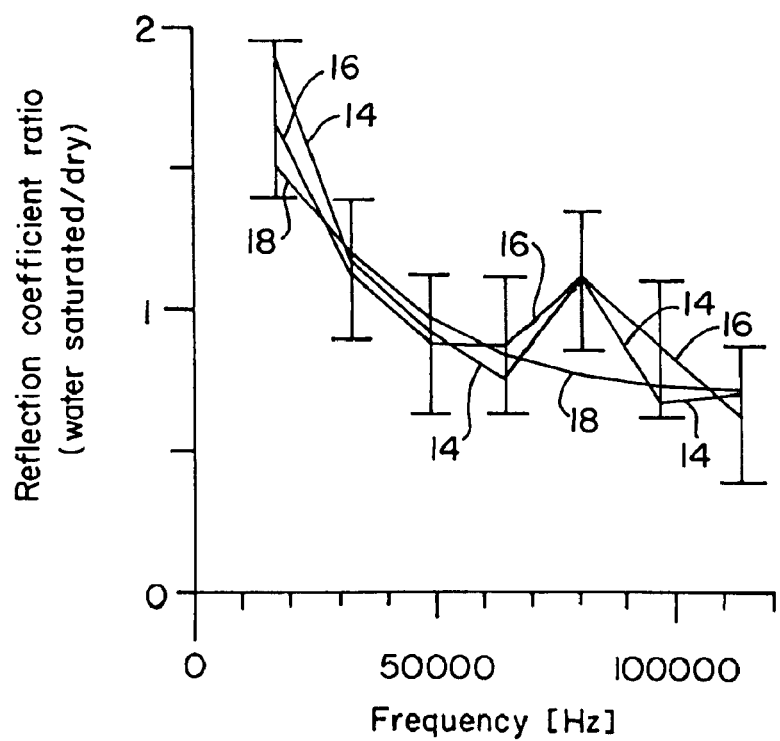
FIG. 4 is a plot of reflection coefficient ratios versus frequency computed from data for a layer, theory for a layer, and theory for a half-space.

Referring to FIG. 4 reflection coefficient ratios versus frequency. Actual data plot 14 matches with theoretical data plot 16. This is compared with a half space data plot 18 for a half space.

Figure 5:
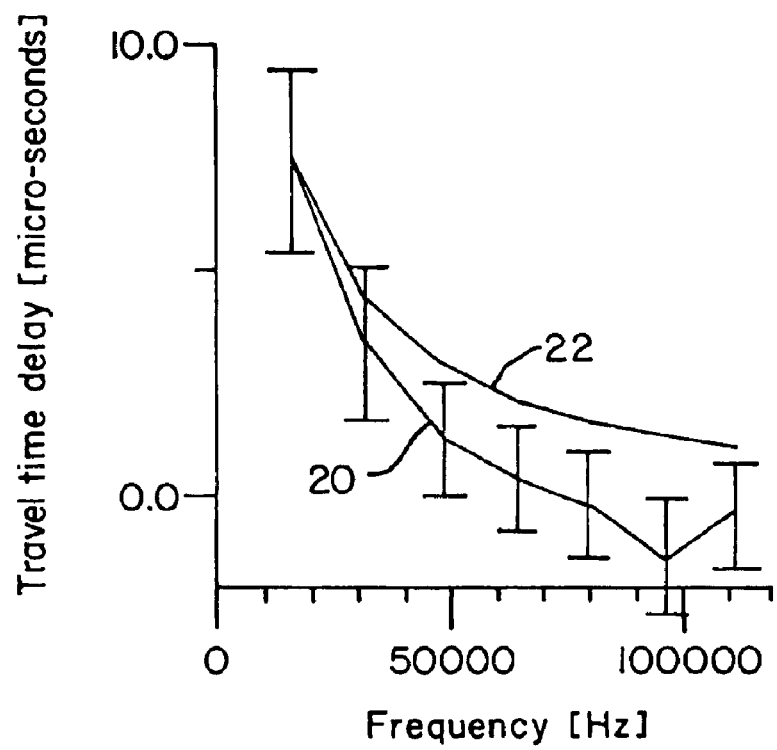
FIG. 5 is a plot of travel-time delay versus frequency for a water-saturated layer with respect to a reflection from a dry layer, the upper curve representing theoretical data and the lower curve representing experimental data.

In FIG. 5, a plot of travel-time delay, in microseconds, from a water-saturated layer with respect to a reflection from a dry layer is shown against frequency. Actual data is plotted in curve 20. The theoretical data is plotted in curve 22.

Figure 1B:
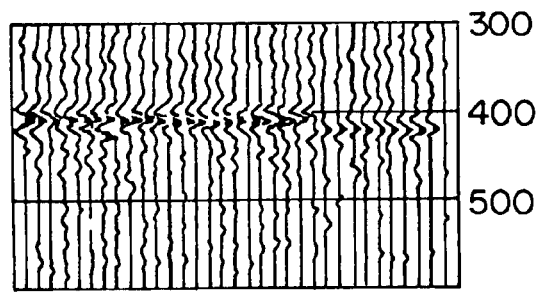
FIGS. 1B, 1C and 1D are respective seismic profiles using common offset gathers by difference filtering for dry (FIG. 1C) and water-saturated cases (FIG. 1D)
Figure 1C:
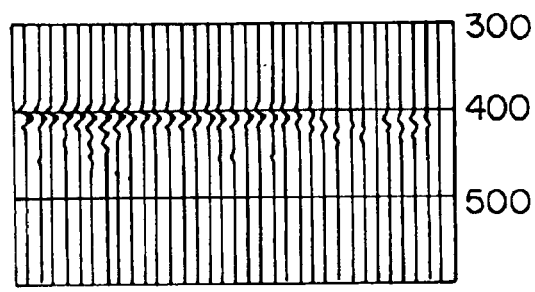
Figure 1D:
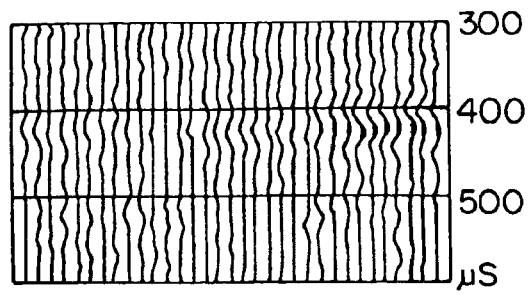
Figure 6:
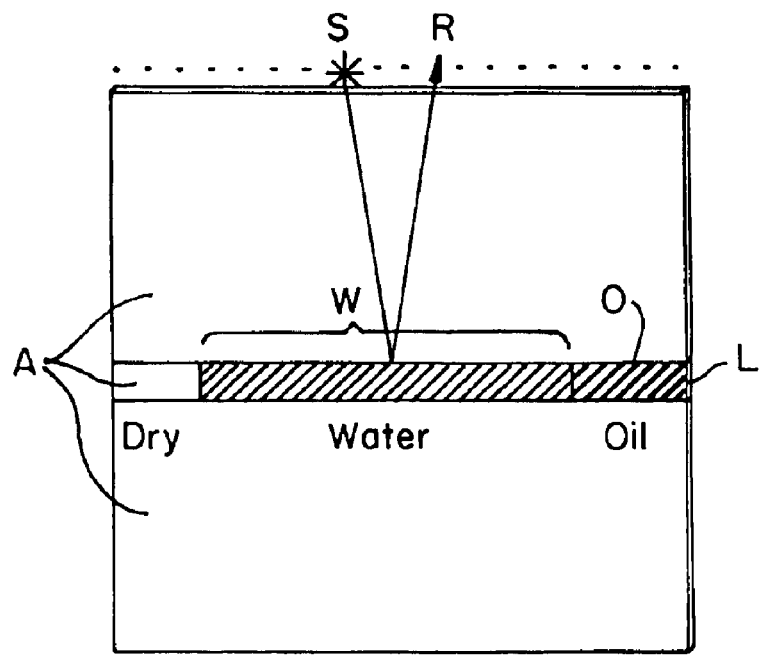
FIG. 6 is an experimental setup for a porous layer having respective dry portions, water-saturated portions, and oil-saturated portions.

Referring to FIG. 6, an experimental model similar to FIG. 1A and FIGS. 2A and 2B is shown. Construction of layer L and the model used are the same as in FIG. 1. Fluid content consists of water W followed by oil O. Physical modeling reflection data was recorded using the surface-constant offset experimental set up shown FIG. 6 to test the thin porous layer for dry, water-saturated, and oil-saturated cases. The layer was 7 mm thick, having 0.32 porosity and about 300 mDarcy permeability. The velocities and densities of the materials were Vp=1700 m per second, Vs=1025 m per second, D=1800 kg/m3 (dry porous layer); and Vp=2300, Vs=1340, D=1200 (Plexiglas).

Figure 7A:
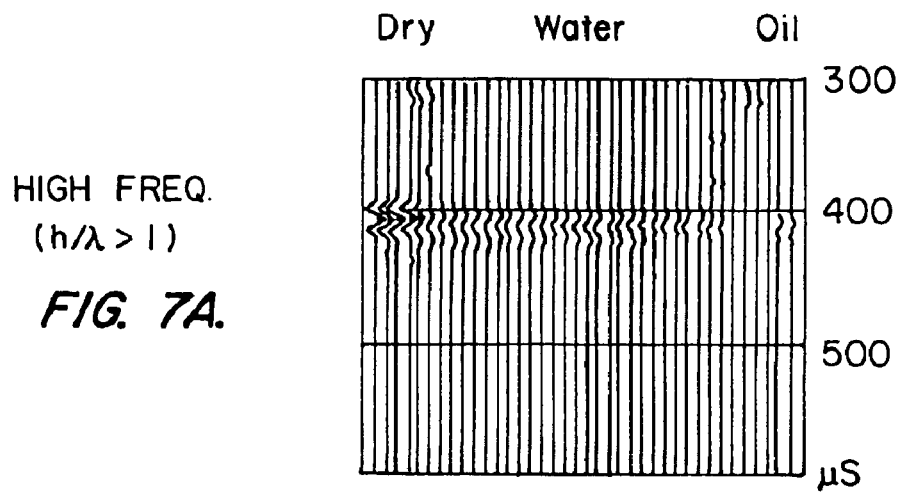
FIGS. 7A, 7B, and 7C are respective high frequency, low-frequency, and very low-frequency vertical seismic profiles of the experimental setup of FIG. 6.
Figure 7B:
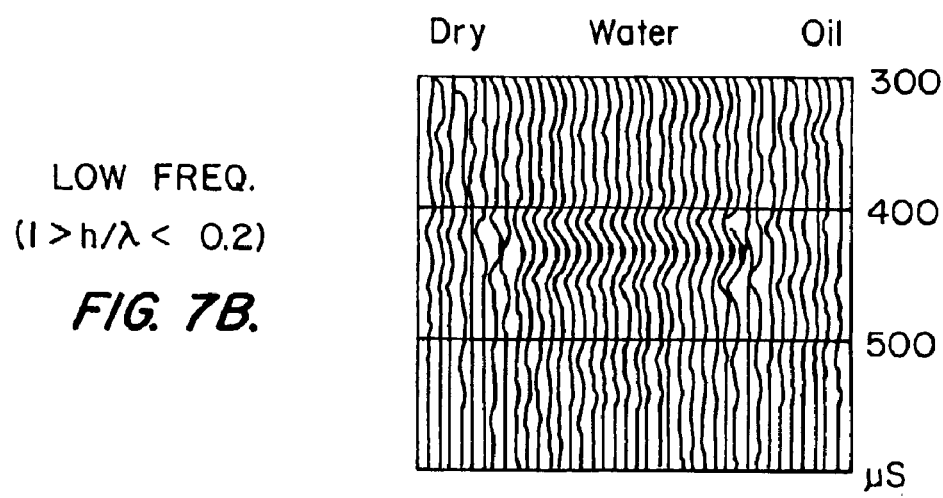
Figure 7C:
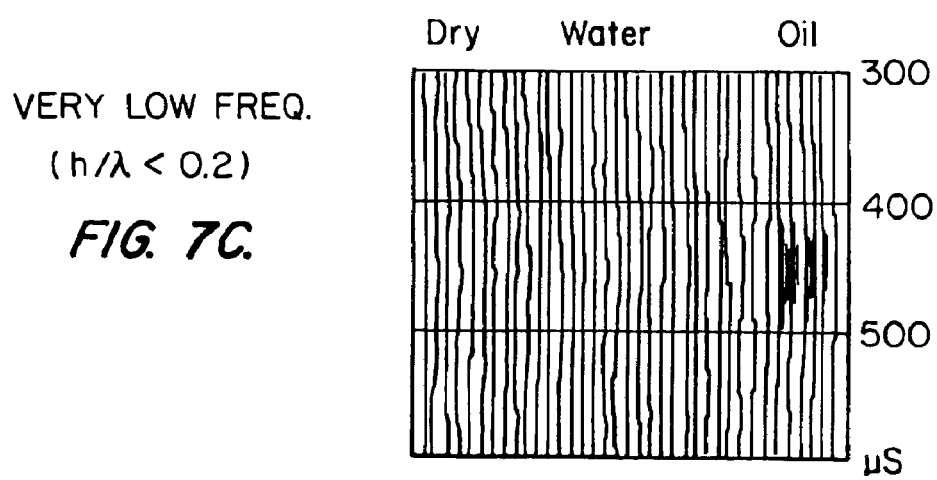

In FIG. 7A, a high-frequency plot is illustrated using common offset gathers by different filtering for dry, water-saturated, and oil saturated cases. FIG. 7B illustrates a low-frequency plot. In this case, the height of a layer L is between 1 and 0.2 of the interrogated layer in wavelength (λ). Finally, FIG. 7C illustrates the plot for a very low-frequency, where the height of a layer L is less than 0.2 of the interrogated layer in wavelength (λ). Note that, with respect to FIG. 7B, the water layer is seen. Likewise, in the very low frequency illustration of FIG. 7C, the oil layer O is prominently displayed.

Figure 8:
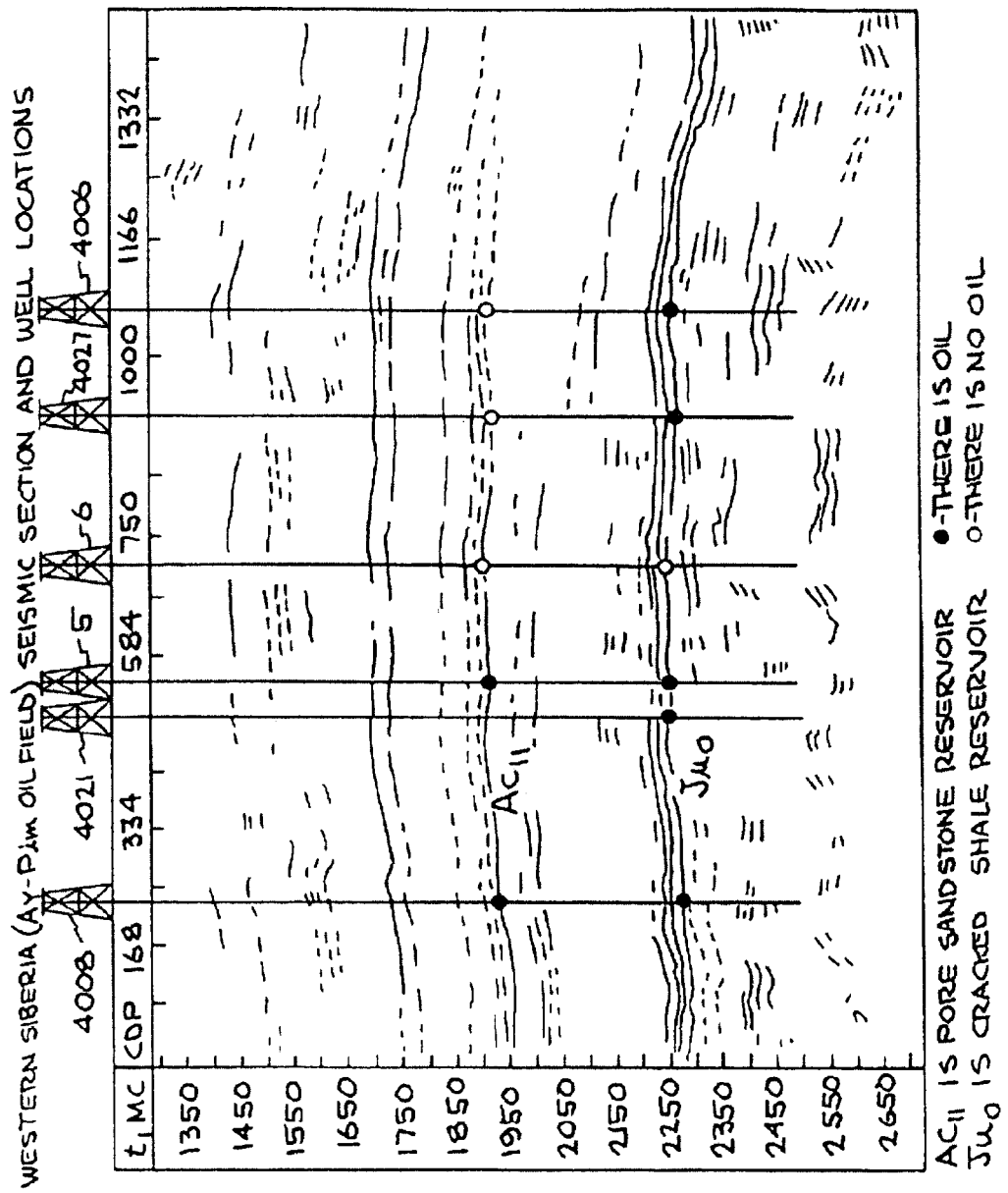
FIG. 8 is a two-dimensional stacked seismic section of real data from a Western Siberian oilfield, using standard processed reflection data from seismic exploration, with boreholes where oil has been both found and not found as indicated on the plot.

Following laboratory testing, real data from a West Siberian oil field was taken. FIG. 8 is an illustration of the standard processed reflection data. Water and oil producing wells are both illustrated.

Figure 9:
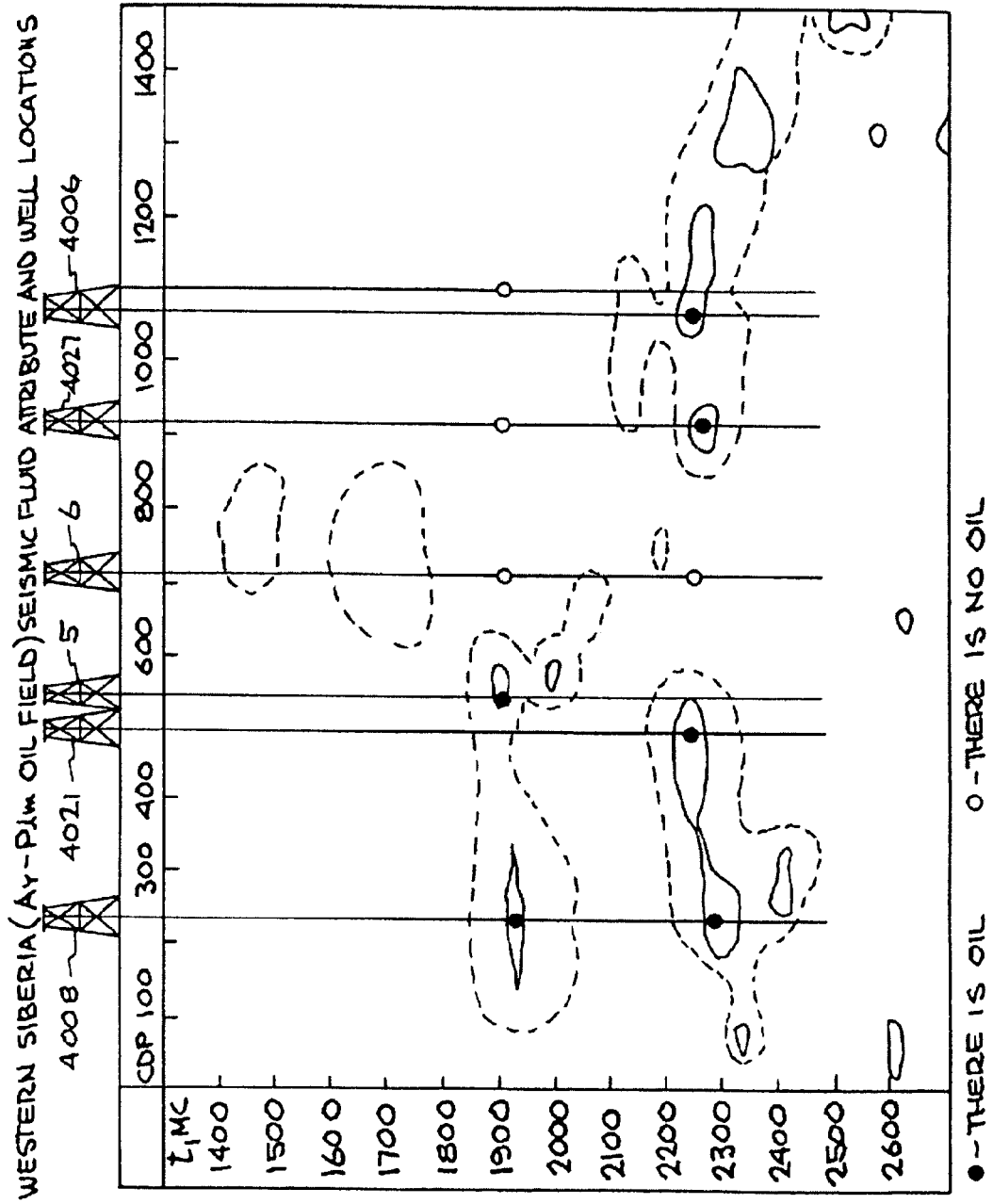
FIG. 9 is a plot of the same data used in FIG. 8, however now using low-frequency processed reflection data according to this invention.

FIG. 9 is an illustration of the identical West Siberian oil field data taken at low frequency in accordance with the teachings of this disclosure.

It can be seen that the conventional process data of FIG. 8 has a poor correlation with the character of saturation of the oil field. When that data is contrasted with the low-frequency processed reflection data shown in FIG. 9, it can be seen that the latter plot gives a good mapping of oil content.

Figure 10:
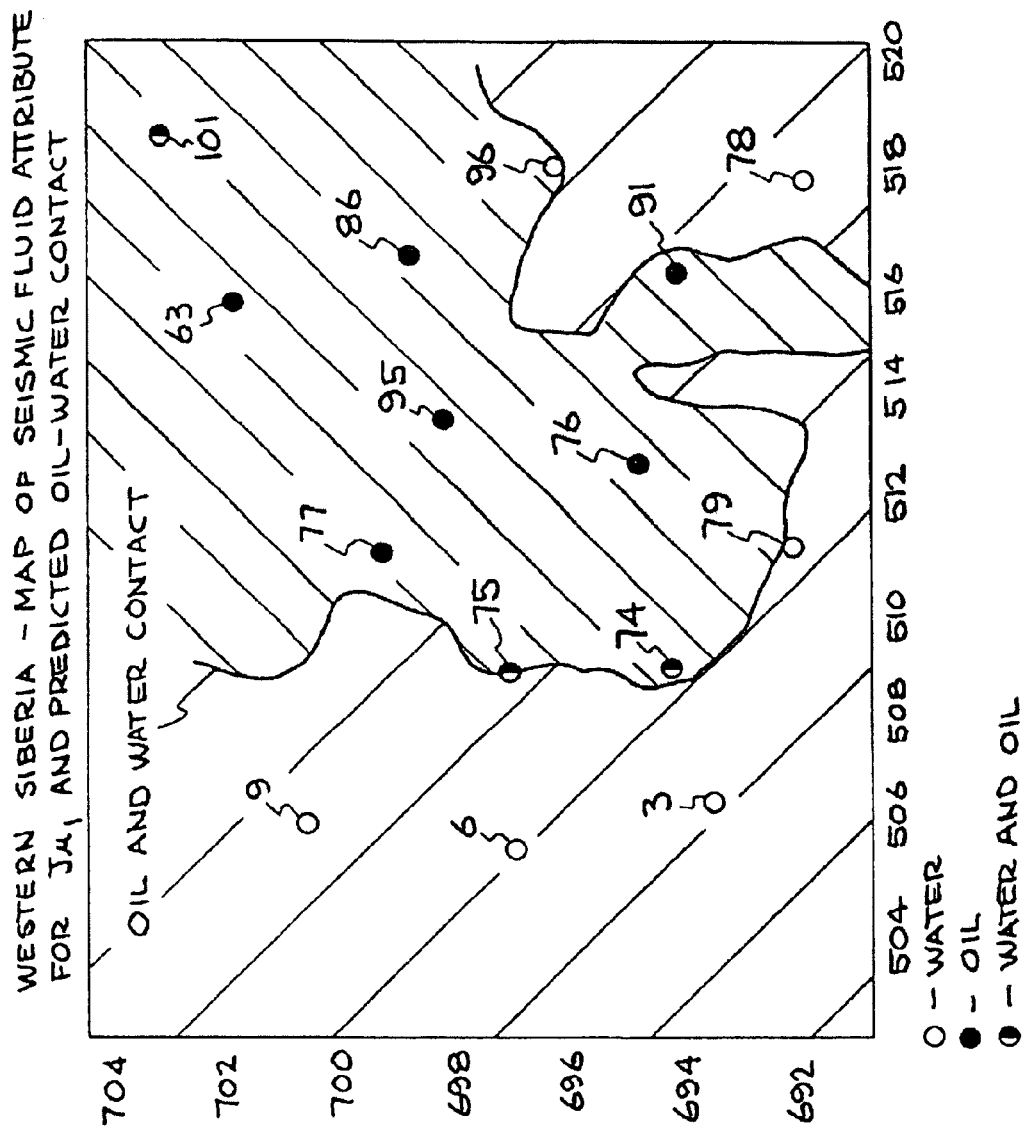
FIG. 10 is a low-frequency reflective image mapping of a water-oil contact boundary and well content, and shows the region and extent of an oil saturated porous region.

Referring to FIG. 10, it will be seen that low-frequency processing of seismic reflection data in three dimensions allows contouring of the oil/water contact within the thin reservoir of another West Siberian oil field reservoir. Wells #9, 76, 91, 95 were used for seismic fluid attribute calibration. Information for wells #3, 5, 63, 74, 75, 77, 78, 79, 86, 96, 101 was disclosed after processing and interpretation for testing purposes. This testing demonstrated very good oil/water contact contouring capabilities of the method.

By using the fluid attribute calibration of where oil was found, it appears that a roughly concave region of oil in FIG. 10 is bounded by the oil/water contact interface. This information can be used for reservoir management so that primary production will initially produce as much of the oil as possible, as well as subsequently in waterflood secondary recovery operations.

From the following description, it will be understood that the technique of this invention can, in effect, be calibrated by the use of exploratory boreholes or wells. Specifically, by taking data for an entire reservoir or oil field, the seismic analysis data can be compared to data determined by boreholes. Using the seismic data from the boreholes, one can equate the probable content and saturation of similarly analyzed seismic data for an oil field to the content and saturation found at the boreholes.

In the following claims, the reconstruction of reflected seismic waves to form intelligible images of underground geologic structures is referred to as "standard processing of recorded reflected seismic waves." This term includes commonly used procedures of seismic data processing such as geometric spreading correction, deconvolution, velocity analysis, normal move out and dip move out corrections, stacking, and more complex reconstruction of seismic signals such as migration, as well as amplitude versus offset analysis. The term "image functions" includes the results of standard processed seismic data represented by of one or two horizontal spatial coordinates and time and/or depth, such as velocity models, time and depth stacked sections, and amplitude variation with offset (AVO) attributes.

Additionally the term is used "frequency dependent data set." This refers to decomposition of a time-domain low frequency part of a recorded seismic reflection into a set of frequency dependent band pass filtered low frequency time-domain data components. The "low frequency data component" refers to utilizing the low-frequency portion of recorded seismic signals Fourier transformed into spectral amplitude vs. frequency format, and using the data found in the left-hand part of the amplitude versus frequency plot resulting from the recorded seismic waves frequency spectra below a low frequency corner of that spectra. The low frequency data component begins at the lowest non-noise frequency, with frequencies below having amplitudes masked by system noise discarded. The upper end of the low frequency data component is also known as the low frequency corner. The low frequency corner is typically bounded at a maximum frequency, which is a lower frequency than the frequency of the maximum amplitude spectrum, and is found when the maximum contrast of the resultant reservoir image is obtained.

For well-behaved Gaussian spectral curves, the low frequency corner would typically appear at about 3 db lower than the maximum amplitude at a frequency lower than that of the maximum amplitude. For real reservoir data with "tuning" effects of geological layered spectral cancellation and reinforcement, the corner could be proportionately less, and be bounded by the peak value of the first local maximum amplitude of the spectral data.

Figure 11:
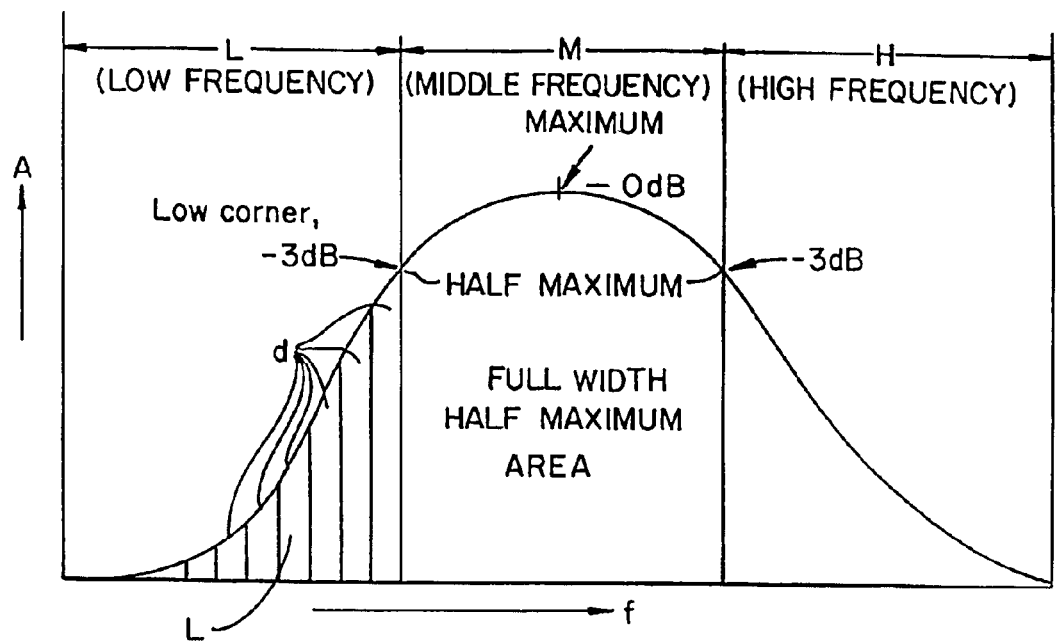
FIG. 11 shows a reflection data amplitude spectrum with the low-frequency data component being confined to the low frequency portion of the spectrum less than about 3 dB of the maximum value.

All claimed here methods of seismic interpretation of underground porous or fractured layers comprised of the following preliminary steps aimed for obtaining frequency dependent data processing results used for subsequent imaging and called here "obtaining of frequency dependent image functions". Referring to FIG. 11, the low frequency data components of reflected seismic data is illustrated. The illustrated graph plots amplitude against frequency for an ideal seismic reflected wave. Generally, amplitude spectra of seismic reflections have a variety of shapes, which depend on several physical parameters, typically comprising: a source and a receiver characteristic, a rock medium and wave propagation distance, and a decay approaching to both low or high ends of the frequency scale. It will be seen that the illustrated curve includes a mean M and a low frequency portion L. Low frequency portion L is here defined is that portion of the total illustrated curve, which is less than minus 3 dB of the total mean value M of the data. When the following claims use the term "low frequency data components", the low frequency portion L is being described. This value is approximately 0.7 (or seventy percent 70%) of the mean value M for this idealized Gaussian spectral distribution. This terminology is consistent with that found in the Encyclopedic Dictionary of Exploration Geophysics, Third Edition by Robert E. Sheriff, © 1991 by the Society of Exploration Geophysicist, especially at the definition of a "filter" as it relates to "band pass."

Figure 12:
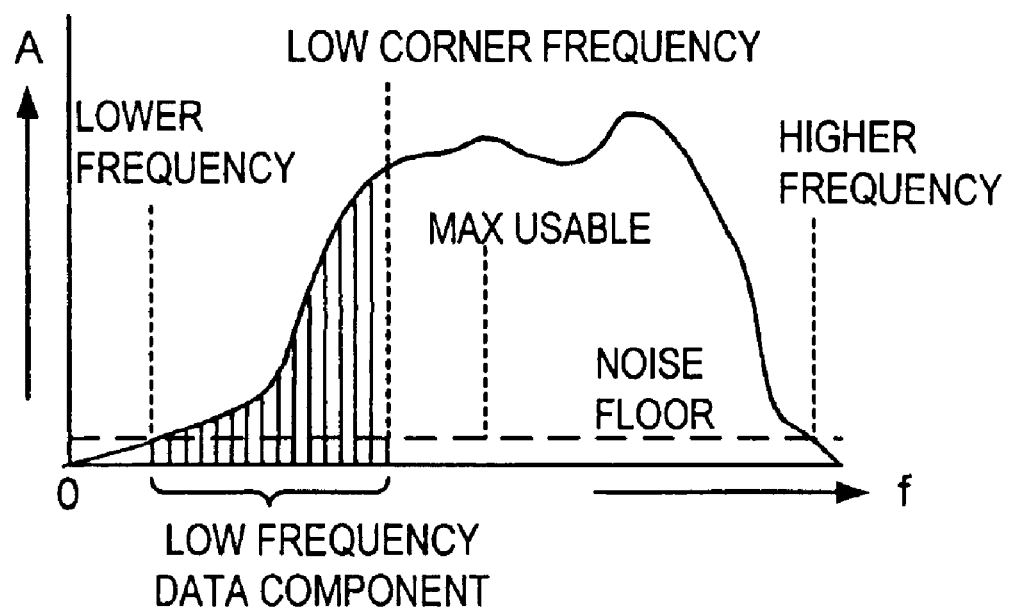
FIG. 12 shows a hypothetical reflection data amplitude Fourier spectrum with the low-frequency data component being confined between a lower frequency bounded by a noise floor, and a low frequency corner.

Referring to FIG. 12, a lesser well-behaved Gaussian spectral curve is illustrated. The noise floor and an illustrative selection of the low frequency data component is given. The noise floor is established by spectral analysis or other methods, as the amplitude that the generic system-under-test generates according to normal engineering and petroleum engineering methods. Once the noise floor is established, the spectral response curve intersected with the noise floor to establish a "LOWER FREQUENCY" and a "HIGHER FREQUENCY." For the purposes of FDPI, a "MAX USABLE" frequency is established about half way between the lower and higher frequencies. For most purposes, this is the highest frequency that will be used as the "LOW FREQUENCY DATA COMPONENT".

It should be noted that if the entire signal spectrum were to be used, from the lower to higher frequency, then FDPI using frequency dependent standard processing would yield the same analytical result as traditional seismic standard processing. Since it has previously been shown that thin layers have decreased response with increasing frequency, the best benefit of this invention occurs at lower frequencies.

Another way to describe this low frequency portion is related to the concept of the full width half maximum value of the frequency distribution, or FWHM. However here, the lower frequency value at approximately seventy percent (70%) of the maximum value (~3 dB reduction in amplitude) of the curve is used as the low frequency corner. The low frequency portion of the curve is then that region at or below the lower of the low frequency corner. For reference, the FWHM is traditionally the difference between the frequencies on either side of a spectral line curve at which the frequency quantity reaches half of it maximum value, or is ~6 dB reduced in amplitude (see McGraw-Hill, Dictionary of Scientific and Technical Terms, Fifth Edition, 1993).

Thus, a method of seismic interpretation of underground porous or fractured layers is disclosed where seismic waves have been directed to an underground target porous or fractured layers and reflected seismic waves from the underground target porous or fractured layers have been recorded according to FIG. 11. First, a plurality of frequency dependent data sets is computed for the low frequency data components at or below the lower of the FWHM frequency value. In the illustration of FIG. 11, a preferred number of six subsets of frequency dependent data sets has been computed. Thereafter, the velocity for each frequency dependent data set is computed to obtain a frequency dependent velocity. Finally, these frequency dependent velocities are imaged using a frequency and average derivative of the velocities with respect to frequency. As has been set forth with respect to FIGS. 9 and 10, the obtained data may be calibrated using well data.

Figure 13A:
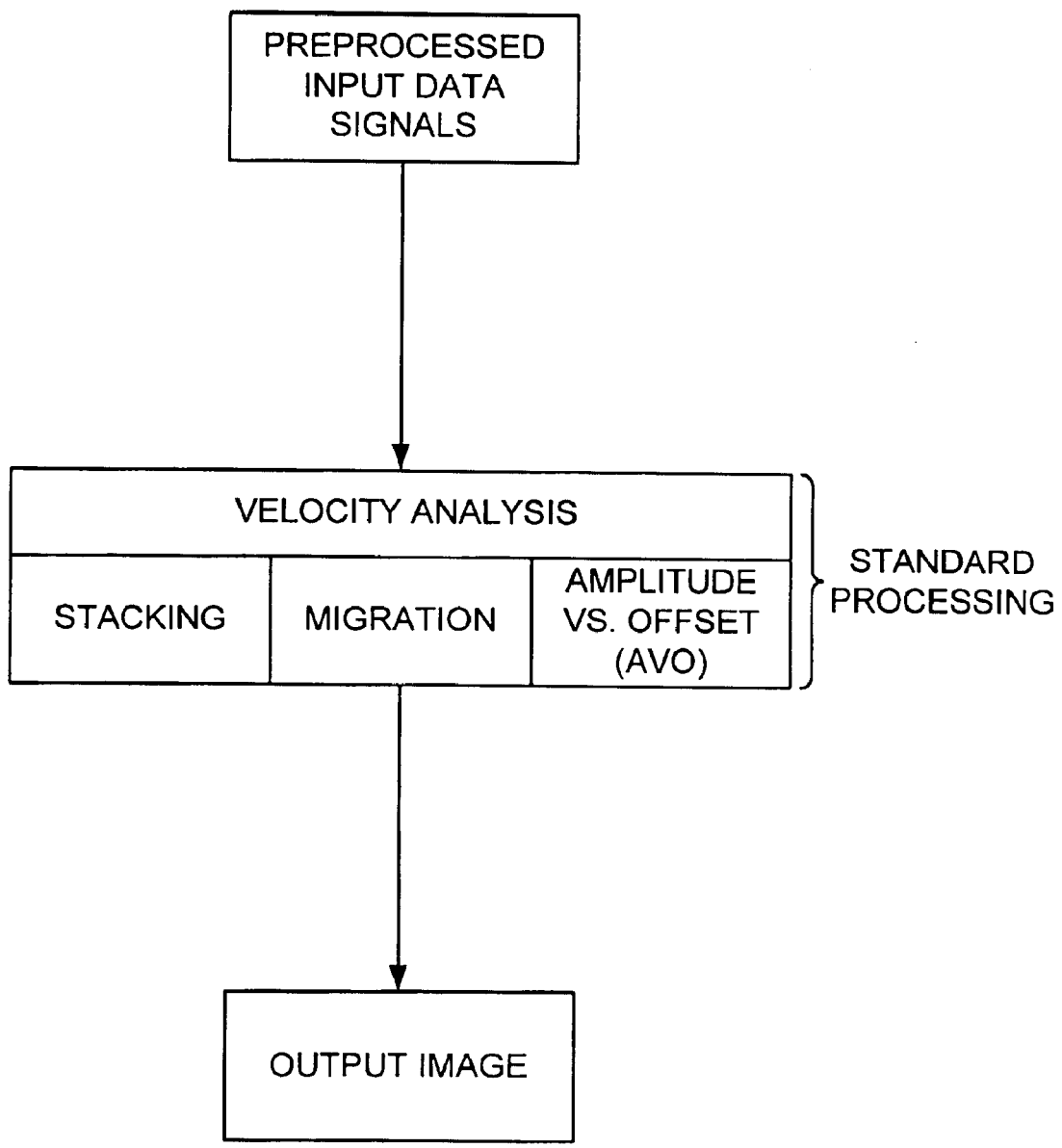
FIG. 13A is a block diagram of traditional seismic analysis using input data signal preprocessing, followed by standard processing techniques to yield an output image.

FIGS. 13A, B, and C show the relationship between frequency dependent processing and traditional seismic analysis techniques. FIG. 13A shows traditional seismic analysis where preprocessed data signals are input into a standard processing package. After velocity analysis, a second analysis is done using stacking, migration, or amplitude versus offset (AVO) to generate an output image. Traditional standard processing uses the preprocessed input data signals as a single data set.

Figure 13B:
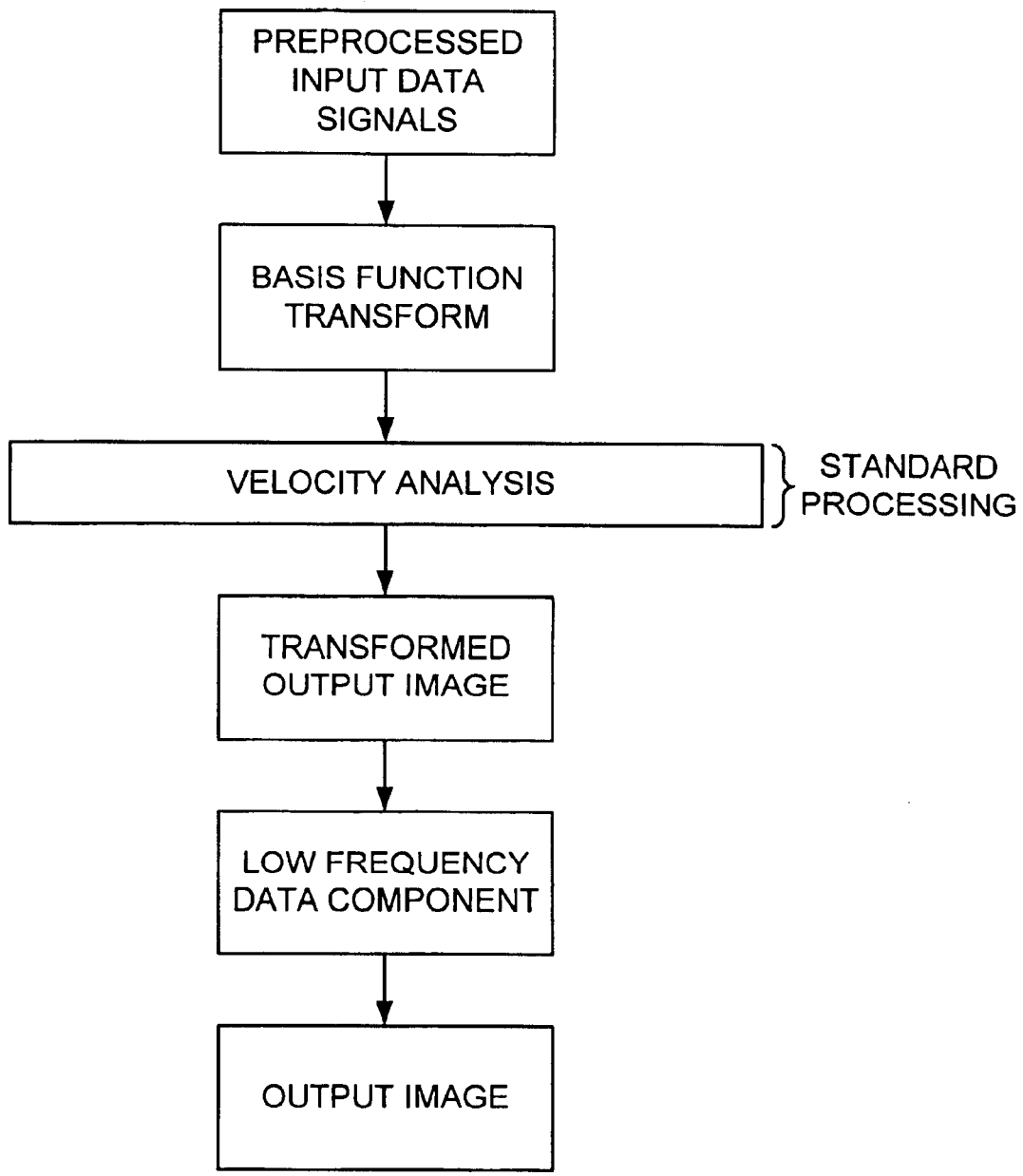
FIG. 13B a block diagram of traditional seismic analysis of FIG. 13A modified using basis function transformation and just the velocity analysis of standard processing, followed by a summation of the transformed output low frequency data component images to yield a frequency dependent output image.

FIG. 13B augments the traditional seismic analysis techniques of FIG. 13A with an initial basis function transformation prior to velocity analysis. All of the FIGS. 13A, B, and C represent simplified illustrative rough functional blocks. Actual computer code representing the implementation is more complicated and hence more difficult to comprehend due to multiply nested looping and optimization to reduce computation time to the minimum low frequency data component where possible. The simplified illustrative rough functional blocks more clearly indicate the boundaries between prior art and this invention.

Referring to FIG. 13B, the basis function transforms the preprocessed input data time-based signals into a bandpass frequency dependent data set. These basis functions can be of virtually any type, so long as they generate a filtered output about some given frequency. For example, a wavelet transformation may be used for each of the center frequencies starting at $$\frac{1}{T}$$

and continuing up to $$\frac{n}{T}$$

for the i=1, 2, . . . n data. Thus, input preprocessed input data time-based signals are effectively bandpass filtered about the center frequency of the wavelet. This resulting filtered data set is then passed through velocity analysis, and results in one component of the transformed output image. When each of the frequencies of the low frequency data component is processed and added together, a resultant output image is obtained.

Since each of the bandpass filtered velocity components represent a velocity at a specific center frequency, successive transformed output images may be numerically differentiated according to widely known numerical analysis techniques to yield an image of the derivative with respect to frequency.

Figure 13C:
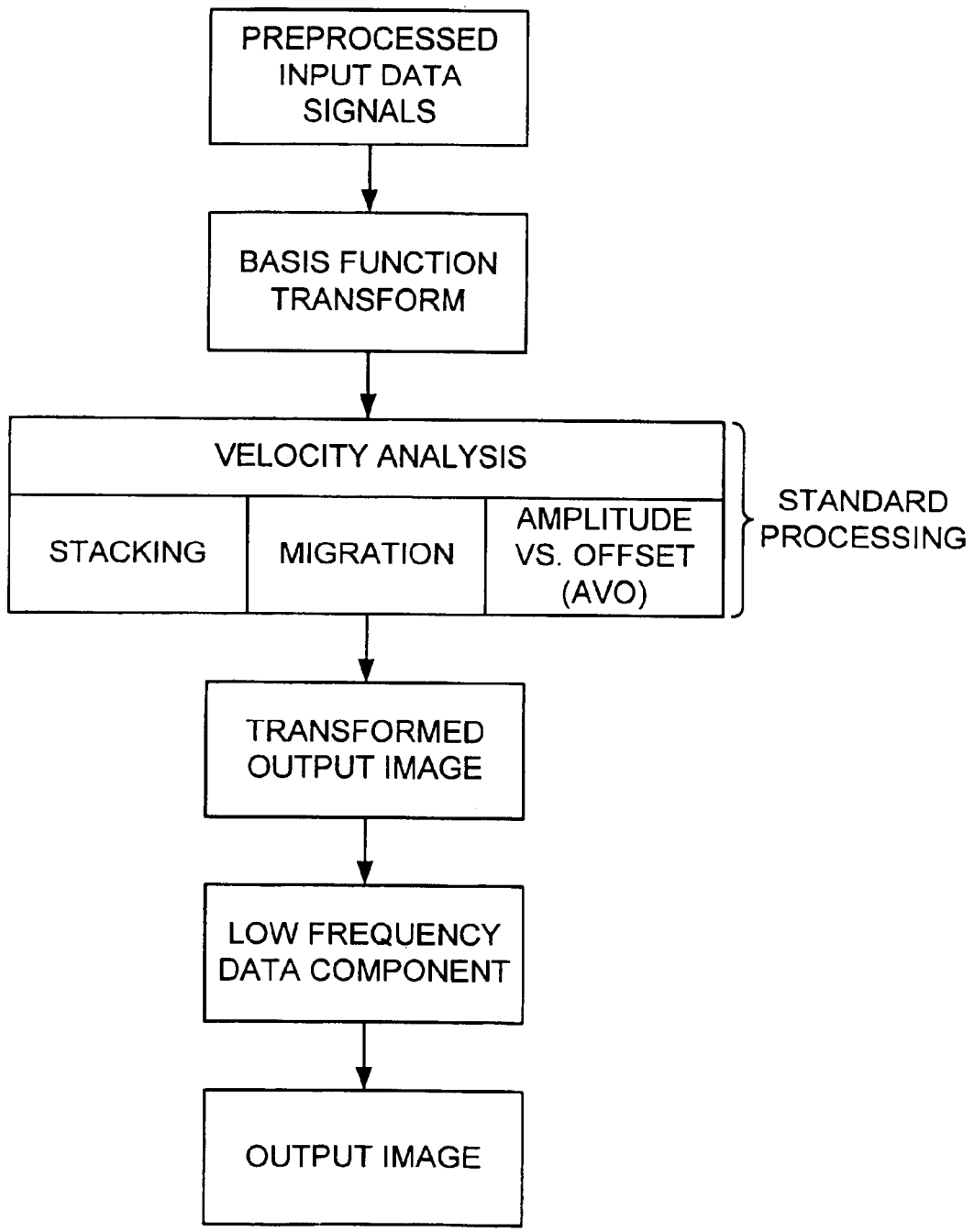
FIG. 13C shows the traditional seismic analysis method depicted in FIG. 13A augmented by frequency dependent processing and interpretation taught in this invention.

In FIG. 13C, the fullest implementation of this invention is described. Here, input preprocessed data signals are basis function transformed at a particular center frequency, passed into velocity analysis, then into any of stacking, migration, or amplitude versus offset (AVO) analysis to produce a single frequency dependent frame of a transformed output image. As the center frequency is incremented through the spectral range of the low frequency data component, more transformed output image frames are accumulated. After all of the low frequency data component frames have been processed, the individual frames are added to produce an output image. As described before, the low frequency corner of the low frequency data component can be increased up to a max usable frequency, or reduced to as low as the lower frequency to produce an output image with best contrast.

FIG. 13C can be used to produce an optimal contrast output image for stacking, migration, and AVO. Additionally, derivative of velocity with respect to frequency can also be used to generate an optimal contrast output image. It is the inventor's experience that depending on the reservoir geology and the data therein, each of these four analytical methods may produce the best of the optimal contrast output images.

Additionally, a method of seismic interpretation of underground porous or fractured layers includes the computing of a plurality of frequency dependent data sets for low frequency data components. Standard image processing of each frequency dependent data set is used to obtain frequency dependent image functions. Thereafter, frequency dependent image functions for low frequency data components are obtained. Finally, imaging of the porous or fractured layer utilizing a frequency average derivative of the image functions over frequency is utilized. Again, obtained well data may be used for calibration.

Further, a method of seismic interpretation of underground porous or fractured layers again includes computing a plurality of frequency dependent data sets for low frequency data components. Thereafter, standard processing of each frequency dependent data set is utilized to obtain frequency dependent image functions. As to the low frequency data components, frequency dependent image functions are obtained for the low frequency data components. Imaging of the porous or fractured layer using the frequency average of the image function occurs.

A method of seismic mapping of underground porous or fractured layers is also disclosed. In this technique, a target reflection is selected from the seismic mapping of underground porous or fractured layers. Thereafter, taking of reference amplitudes and a reference arrival times of the target reflection occurs using image functions computed for frequencies above a low frequency corner. Next, frequency dependant image functions are obtained for the target reflection for the low frequency data components. Finally, mapping of the porous or fractured layer using a ratio of the frequency average image of the low frequency data components to reference amplitude occurs. Again, extant well data can be used to calibrating the resultant image.

Further, and as described in the immediately preceding variant of this technique, a target reflection may be selected from an image function for the seismic mapping of underground or porous fractured layers. Reference amplitude and reference arrival times of the target reflection are picked using image functions computed for frequencies above the low frequency corner. Thereafter, frequency dependant image functions for the target reflection are obtained for the low frequency data components. Finally, mapping of the porous or fractured layer using a difference of the frequency average image of the low frequency data components and reference amplitudes is utilized.

As an additional variant, a method of seismic mapping of underground porous or fractured layers includes selecting of a target reflection in and image function. Thereafter, arrival times of the target reflection using image functions computed for frequencies above the low frequency corner are utilized. Next, frequency dependent image functions for the target reflection for using the low frequency data components are made. Taking the low frequency arrival times of the target reflection utilizing the frequency dependant image function follows. Finally, mapping of the porous or fractured layer using the difference of the frequency average of the low frequency arrival times and reference arrival times occurs. Again, and as applicable to all of the above-described variations, actual well data may be utilized to process and calibrate the image.

The readers attention is directed to FIGS. 9 and 10. These images of underground fractured or porous layers have never existed before the advent of the technique described herein. For the first time, we have been able to reliably image narrow underground porous or fractured layers. Further, by utilizing extant bore hole information, a correlating that information with the images obtained, liquid finds at a bore hole can be extracted to other parts of an image with high reliability. Thus, the produced images (or maps) of the seismic data are highly useful manufactured articles utilizing this technique.

It is believed that the image of FIG. 10 is especially instructive in this regard. The imaged field of the porous or fractured layers will typically be the subject of state of the art advanced oil extraction techniques. These techniques will include the drilling for oil and the injection of fluids (usually containing water) to assist in the extraction of oil.

Extracting oil in the wrong location limits useful well life and can be a detriment to the potential production of a whole field. Further, injecting fluid at the wrong location can shorten the utility of a drilled well and even be detrimental to the total possible production of the oil field. The image produced by this technique leverages the ability of those skilled in oil or gas extraction to obtain a precise three-dimensional topographic plot of an interrogated field. This enables the best possible judgments to be exercised in both fluid extraction from and fluid injection to a seismically interrogated field in accordance with this disclosure. While we do not attempt to disclose how that judgment should be exercised, we do provide a superior image article from which such judgments can be based.

All publications, patents, and patent applications mentioned in this specification are herein incorporated by reference to the same extent as if each individual publication or patent application were each specifically and individually indicated to be incorporated by reference.

The description given here, and best modes of operation of the invention, are not intended to limit the scope of the invention. Many modifications, alternative constructions, and equivalents may be employed without departing from the scope and spirit of the invention.

What is claimed is:

1. A method of seismic interrogation of underground porous or fractured layers where seismic waves have been directed to underground target porous or fractured layers and reflected seismic waves from the underground target porous or fractured layers have been recorded, the method comprising the steps of:

obtaining of a plurality of frequency dependent data sets for low frequency data components of the seismic waves;

computing for each frequency dependent data set at least one function chosen from the group consisting of:
an average relative reflected amplitude,
a derivative of the average amplitude with respect to frequency, and
a derivative of the average time delay with respect to frequency;

imaging the porous or fractured layer from the data sets using the at least one function.

2. The method of seismic interrogation of underground porous or fractured layers according to claim 1 and wherein the computing step includes:

computing for each frequency dependent data set the average relative reflected amplitude and the derivative of the average amplitude with respect to frequency.

3. The method of seismic interrogation of underground porous or fractured layers according to claim 1 and wherein the computing step includes:

computing for each frequency dependent data set the average reflected amplitude and the derivative of the average time delay with respect to frequency.

4. A method of seismic interrogation of underground porous or fractured layers according to claim 1 and wherein the computing step includes:

computing for each frequency dependent data set the derivative of the average amplitude with respect to frequency and the derivative of the average time delay with respect to frequency.

5. The method of seismic interrogation of underground porous or fractured layers according to claim 1 and wherein the computing step includes:

computing for each frequency dependent data set the average relative reflected amplitude, the derivative of the average amplitude with respect to frequency, and the derivative of the average time delay with respect to frequency.

6. The method of seismic interrogation of underground porous or fractured layers according to claim 1 and including the further step of:

calibrating the obtained data by using coincident field data taken by at least one bore hole.

7. The image of the process of claim 1.

* * * * *